United States Patent Office 3,535,153
Patented Oct. 20, 1970

3,535,153
CURED PRESSURE-SENSITIVE ADHESIVE
COMPOSITION AND TAPE
Ralf Korpman, East Brunswick, N.J., assignor to Johnson
& Johnson, a corporation of New Jersey
No Drawing. Filed Dec. 27, 1966, Ser. No. 604,604
Int. Cl. C09j 7/02
U.S. Cl. 117—122
15 Claims

ABSTRACT OF THE DISCLOSURE

This application discloses pressure-sensitive adhesive compositions, tapes and sheets wherein the adhesive formulation comprises low-styrene butadiene-styrene copolymers as the sole effective elastomer and liquid polymeric tackifiers comprising a reacted plasticizing component selected from the group consisting of diene and indene structures and a reacted styrene component selected from the group consisting of styrene and lower alkyl ring substituted styrene structures. These adhesives also include oil soluble elastomer-reactive heat curing aldehyde resins for curing the adhesive composition with or without an accelerator such as zinc resinate.

The present invention relates to pressure-sensitive adhesive compositions, tapes and sheets and, more particularly, to normally tacky and pressure-sensitive adhesive compositions which are adapted to be heat cured in situ after application to a tape backing; and to the resulting pressure-sensitive adhesive tapes.

Pressure-sensitive adhesive compositions of this type normally comprise an elastomer, or elastomeric constituent, which provides adhesive strength and elasticity; a tackifier to contribute the desired tackiness or quick stick, i.e., the ability to stick quickly or grab onto an application surface; and a curing agent for heat curing the adhesive composition after it is applied to a sheet or tape backing. Various other materials such as accelerators for the heat cure, stabilizers, antioxidants, fillers and the like may be included to adapt the adhesive for a particular application. In this type of composition, the properties of a given formulation cannot be attributed to any one of the constituents acting alone, but rather to the chemical and physical cooperation of the different components of the resulting adhesive system.

I have discovered that, by utilizing a novel adhesive composition based upon a low-styrene synthetic copolymer of butadiene and styrene as the sole effective elastomer, or elastomeric constituent, I can produce pressure-sensitive adhesive tapes and sheets possessing properties heretofore unavailable. These elastomers commonly are called SBR or GRS rubbers.

For instance, pressure-sensitive adhesive tapes according to this invention may be formulated to possess outstanding tack at all temperatures, including temperatures below 0° C., without sacrificing the adhesive and cohesive strengths of the adhesive layer and without danger of "ghosting" or leaving traces of the adhesive on the application surface after removal of the tape. Previous butadiene-styrene adhesives, in particular, have been deficient in this property; and when extended or plasticized sufficiently to achieve tacky behavior at normal temperatures they possessed inferior heat resistance. An advantageous feature of the adhesives of this invention is that their tack level remains more constant over a wide range of temperatures than heretofore achieved for related products.

Tapes of this invention may be formulated to achieve superior resistance to baking cycles such as are encountered when masking tapes are employed in automotive spray painting applications, and to possess high temperature holding properties heretofore unavailable in tapes utilizing natural rubber elastomers. For instance, such adhesives will withstand baking cycles as long as 120 minutes at 360° F. and will exceed the holding properties of pressure-sensitive adhesives based on natural rubber by several-fold at temperatures of between 200 and 360° F. Natural rubber adhesives, on the other hand, show optimum hold properties only between room temperature and 180° F.

Another superior feature of the pressure-sensitive adhesives of my invention is their high degree of anchorage when coated on most conventional paper tape backings and cured to the same state as natural rubber adhesives. A further advantage of my pressure-sensitive adhesives is their resistance to ultra-violet exposure. Because of this property, tapes of this invention may be applied where sunlight would normally deteriorate the natural rubber based adhesives previously used.

Thus, for the first time, I have achieved an all-SBR, elastomer-based pressure-sensitive adhesive system which combines all of the above described unique properties and provides a multiplicity of tapes ranging from freezer tapes to masking tapes suitable for high-temperature oven baking applications.

Heretofore, most commercial pressure-sensitive adhesive tapes have been based upon natural rubber. The normal aging behavior of natural rubber is such that polymer degradation even under the best formulated types of adhesives tends to undergo chain scission, resulting in soft and unusable adhesives. Since SBR rubbers increase in modulus on aging, it has been common practice to add SBR rubber to natural rubber in amounts of up to about 50 percent by weight of the elastomer, in order to minimize the effect of scission in the natural rubber. The aging of natural rubber adhesives may also be improved by using the more age-resistant tackifying resins and is exemplified by the shift in the use of such resins from rosin type derivatives to polyterpene resins which are commonly used today. These terpene resins are derived from alpha or beta pinene and are available in a range of melting points. A similar improvement in the aging of adhesives based upon SBR elastomers is not attainable by shifting from rosin type resins to the terpene resins because of the incompatibility of the latter in butadiene-styrene polymers. In the past, it has been suggested to improve the compatibility of the better aging terpene resins with SBR type rubbers by using a high content of a solubilizing oil which can provide improved compatibility between terpene type resins and butadiene-styrene elastomers. Lanolin as a plasticizer designed to improve compatibility of polyterpenes in SBR butadiene-styrene rubbers also has been disclosed in my U.S. Letters Pat. No. 2,999,769. Such terpene modified butadiene-styrene adhesives, however, failed to achieve all of the advantages embodied in adhesives of my present invention, and it is pertinent that no commercial pressure-sensitive adhesive tape based on an all SBR elastomer has found sustained or widespread usage for any purpose. It is further evident from the many examples provided that a wide range of useful adhesives can be derived from the unique adhesive systems now to be disclosed.

The novel pressure-sensitive adhesive composition of my invention comprises an SBR rubber component as the sole effective elastomeric constituent, a compatible liquid tackifier selected from a particular class of hydrocarbon copolymers, and an oil soluble elastomer-reactive heat curing aldehyde resin for curing the composition. The liquid hydrocarbon tackifier copolymer of this invention comprises a reacted plasticizing component selected from the group consisting of diene and indene structures and a reacted styrene component selected from the group consisting of styrene and lower alkyl ring substituted styrene structures. The styrene component may be in the form of styrene itself, i.e., unsubstituted vinyl benzene, or lower alkyl ring substituted styrene structures such as ortho, meta and para vinyl toluenes. The plasticizing component is present in the amount of about 15–80 percent by weight of the tackifier copolymer and the styrene component is present in the amount of about 85–20 percent by weight of said copolymer. The tackifier copolymer of this invention possesses a Brookfield viscosity at room temperature of between about 5,000 and 2,500,000 centipoises and preferably not above about 500,000 centipoises, and can generally be described as a viscous or viscid liquid.

For convenience hereinafter, the above-described curable liquid tackified adhesive wherein SBR rubber is the sole effective elastomer will sometimes be referred to as the all SBR adhesive of this invention. For the purposes of this invention, the term SBR elastomer or SBR rubber means low styrene synthetic copolymers of butadiene and styrene consisting essentially of about 70–90 parts butadiene and 30–10 parts styrene by weight of the elastomer.

An important advantage of the all SBR adhesives of this invention is that they may be coated onto backings, such as impregnated paper sheets, at exceptionally high rates, without loss of anchorage to the backing. For instance, they may be coated on various substrates at more than twice the maximum speed attainable with all natural rubber pressure-sensitive adhesives, without danger of losing the necessary anchorage or adherence of the adhesive layer to the backing. This feature makes it possible to produce the pressure-sensitive tapes and sheets of this invention at maximum curing speeds. Since many of the adhesives of this invention can be cured in a fraction of a minute, exceptional manufacturing speeds thereby are made possible.

Among the liquid tackifiers of this invention are Buton 100, a liquid polybutadiene-styrene polymer containing a high degree of unsaturation and low-styrene modification (about 25%) and commercially available from the Enjay Chemical Company; and Picco L–30–3, a hydrocarbon polymer comprising dicyclopentadiene and vinyl toluene, and Picco N–10–5, a liquid polyindene polymer containing substituted styrene groups, all of which are commercially available from the Harwick Standard Chemical Company. Minor amounts, say 10–25 percent, of a compatible oil such as a napthenic oil may be added to extend the tackifier and lower its cost, or to provide a liquid tackifier of the proper viscosity, but larger amounts are not desirable because of the tendency of the oil to migrate. Such resins are exemplified by TPO #1, a combination of mainly a petroleum hydrocarbon polymeric resin (about 70–77%) with a minor amount of saturated napthenic oil and wherein the hydrocarbon polymer portion consists of styrene, ring substituted styrenes and indene, as well as a small percentage of isoprene, offered commercially by Velsicol Chemical Corporation; and Piccodiene 2050, a styrenated hydrocarbon similar to TPO #1, which is offered commercially by the Harwick Standard Chemical Company. In general, the viscous liquid tackifier can utilize higher proportions of styrene, the lower the molecular weight of the tackifier copolymer; and substituted styrenes are useful in higher proportions of the copolymer than is unsubstituted styrene.

The oil soluble elastomer-reactive heat curing phenol formaldehyde resin of this invention may be an octyl phenol formaldehyde resin such as Amberol ST–137 sold by Rohm and Haas Co., a nonyl phenol formaldehyde resin such as Resin B described in Examples I and II of United States Letters Patent No. 2,987,420, or the like. However, certain bromo-methyl alkylated phenol formaldehyde resins, such as the SP–1055 and SP–1056 resins sold by Schenectady Varnish Co., Inc., are preferred for maximum curing speed and superior tack. Bromo-methyl alkylated phenol formaldehyde resins of this type and methods of producing them are described in United States Letters Patent No. 2,972,600 and may be generally described as para alkyl phenol formaldehyde resins bromomethylated in one or both of the ortho positions. For instance, they include the products resulting from the bromination of phenol formaldehyde resins formed from 2-hydroxymethyl 4-alkyl phenols; 2,6-dihydroxymethyl 4-alkyl phenols, and resitols comprising an average of up to 4 phenol units based thereon. These bromo-methylated resins normally contain about 1–9 percent by weight of combined bromine, and 4 to 20 carbon atoms in the para alkyl group.

Preferably, also, the all SBR pressure-sensitive adhesive of this invention includes an accelerator for the aldehyde cure. The preferred accelerator when phenol formaldehyde curing resins are used is zinc resinate, although other accelerators may be used. Acid accelerators such as para toluene sulfonic acid or stannous chloride also may be used and are preferred with urea and melamine formaldehyde curing resins.

The liquid tackifiers of this invention may be present in the all SBR adhesive composition in the amount of about 25–500 parts tackifier per 100 parts of the SBR elastomer. When proportions are given herein in terms of parts, this shall means parts per one hundred parts of elastomer, unless otherwise specified. It is preferred that the tackifier be present in the amount of about 100–200 parts when an all purpose or a high tack adhesive is desired. Similarly, about 5–75 parts of the curing resin may be used in the adhesive composition of this invention, although about 15–30 parts is preferred. Various proportions of the accelerator constituent may be used. Normally, no more than about 25 parts of zinc resinate is employed, although up to about 50 parts may be used for certain applications. The preferred range for zinc resinate is about 5 to 20 parts, with about 5 to 10 parts being preferred for maximum tack, and about 10 to 15 to 20 parts preferred for maximum curing speed. With an acid accelerator such as para toluene sulfonic acid or stannous chloride, on the other hand, the amount of accelerator should be about 1–5 parts.

The invention will be further illustrated by the following examples. It should be understood that although these examples may describe various specific features of the invention, they are given only for the purpose of illustration and the invention should not be construed as limited thereto.

EXAMPLES I AND II

Two adhesive compositions according to this invention are formulated by mixing an all butadiene-styrene copolymer elastomer, SBR 4502, supplied by Goodrich Gulf Chemical Company, with a tackifier according to this invention (Buton 100), curing agent (Amberol ST–137), accelerator (zinc resinate), anti-oxidant (Agerite Superlite or Butyl Zimate) and toluene in the proportions indicated in Table A, below.

Each of these adhesive compositions then is coated by a conventional coating technique upon one side of an impregnated paper backing sheet which previously was coated on the other side with a release coating composition. The backing is prepared from a 28½ lb. creped kraft paper which is impregnated to increase its internal strength, as described in United States Letters Patents No. 2,848,105 to Bartell et al. The release coating composition is formulated and applied as described in United States Letters Patent No. 2,913,355 to Collins. Both the impregnant and release coating are dried and cured prior to application of the adhesive.

The adhesive composition is applied to the backing by reverse roller coating at a coated weight of approximately 1.8 oz./sq. yd. and the coated backing is dried quickly at approximately 180° F. to remove a substantial proportion of the toluene solvent therefrom. Then, the sheet is passed through a curing oven maintained at a temperature of approximately 340° F. The curing times are indicated for each of the examples. The proportions given are in parts, unless otherwise indicated.

TABLE A

|  | I | II |
|---|---|---|
| SBR 4502 | 100 | 100 |
| Amberol ST-137 | 25 | 30 |
| Zinc resinate (Zirex) | 15 | 20 |
| Agerite Superlite | 2 |  |
| Butyl Zimate |  | 2 |
| Buton 100 | 150 | 150 |
| Percent solids in toluene | 32 | 50 |
| Adhesion to steel (oz.) | 52 | 85 |
| Quick Stick | 3.6 | 4.2 |
| Curing time (min.) | 1 | ½ |

The resulting adhesive sheet then is slit into tapes one inch wide and wound upon itself on cores to form rolls of pressure-sensitive adhesive tape. The tapes of these examples exhibit high adhesive strength and quick stick, as indicated in Table A. These tapes also possess excellent high temperature stability and holding properties and may be removed from surfaces to which they have been attached after having been exposed to a temperature of 300° F. for at least 4 hours, without ghosting or leaving any traces of adhesive upon the application surface. This high temperature test simultaneously demonstrates the cohesive or internal strength of the adhesive layer of the tape, as well as its ability to hold to a smooth surface at high temperatures, and the fact that the tapes do not ghost when removed from the surface after being subjected to the most severe conditions.

The adhesive strength or adhension to steel is measured by peeling the tape backing over itself 180° at a constant speed (by a force applied to the free end of the tape) from a smooth steel surface to which it has been applied by a fixed pressure. For the techniques used in conducting this test, see the 180° peel adhension test PSTC-I of the Pressure Sensitive Tape Council.

Quick stick is measured by laying a length of tape, adhesive side up, upon a horizontal surface and then rolling a hollow plastic ball down an incline onto the adhesive. The vertical height at which the ball starts and the distance the ball rolls along the tape before the height in inches raised to the three-halves power, coming to rest is measured. Quick stick is reported as divided by the distance rolled in inches. This ratio is found to be a constant for a given tape. The ball is plastic and approximately 1.5 inches in diameter, and and weighs approximately 2 grams. Its outer surface is carefully cleaned between each test.

The following comments are made with respect to certain of the ingredients listed in the foregoing Examples I and II.

The elastomer, SBR 4502, is a 75–25 copolymer of butadiene and styrene, and is glue-acid coagulated.

Amberol ST-137 is a para octyl phenol formaldehyde resin made from the alkaline condensation of para tertiary octyl phenol and formaldehyde, and having a melting point of about 87° C.

Agerite Superlite is a poly alkyl poly phenol, soluble in toluene, and Butyl Zimate is a zinc dibutyl dithiocarbamate. Both are supplied by R. T. Vanderbilt Company.

Buton 100 is a liquid butadiene-styrene (75–25) copolymer of low-molecular weight (8,000–10,000) and high unsaturation (iodine approximately 300) with a high percentage of terminal olefin groups. This material is available from the Enjay Chemical Company, as indiacted hereinbefore.

EXAMPLES III–V

Four additional adhesive compositions according to this invention are formulated from the same SBR elastomer (SBR 4502) as used in the foregoing examples employing the tackifiers listed in Table B, below, (and described hereinbefore) with the other constituents of the following formulation in the proportions indicated.

| Material: | Proportion |
|---|---|
| SBR 4502 | parts__ 100 |
| Tackifier | do____ 150 |
| Schenectady SP-1056 | do____ 15 |
| Zinc resinate | do____ 5 |
| Agerite superlite | do____ 2 |
| Toluene | percent solids__ 50 |

Schenectady SP-1056 is a heat-reactive, bromo-methyl alkylated, phenol formaldehyde resin having a specific gravity of 1.05 and a melting point of 135° F., of the type generally described in U.S. Letters Pat. No. 2,987,420. This material has a bromine content of about 6 percent or over and a methylol content of about 10 to 12½ percent, both by weight of the resin, and is available from the Schenectady Varnish Co., Inc., as indicated hereinbefore.

The adhesive compositions were mixed as described in connection with the foregoing examples and coated on a similar paper backing, dried, cured and then slit into tapes of one inch width and tested for adhesion to steel and quick stick with the following results.

TABLE B

| Example | Tackifier | Adhesion to steel (oz.) | Quick Stick |
|---|---|---|---|
| III | Picco L-30-3 | 39 | 44 |
| IV | Piccodiene 2050 | 29 | 18 |
| V | Picco N-10-5 | 42 | 10 |

These tapes all exhibit amazingly high quick stick without substantially sacrificing adhesive strength.

EXAMPLES VI–XVII

A series of adhesive compositions are prepared in accordance with this invention from the constituents listed in Table C, below. All proportions are given in parts, unless otherwise indicated.

The elastomer is either the glue-acid coagulated SBR 4502, or SBR 1006 which is a salt-acid, coagulated 75–25 butadiene-styrene copolymer. The tackifier is either TPO #1 which is described hereinbefore, or TPO #2 which has substantially the same composition as TPO #1 except that it possesses a somewhat higher molecular weight and a higher Brookfield viscosity, as indicated in Table E, below, or a combination of these two tackifiers. Both Amberol ST-137 and Schenectady SP-1056 are used individually and together as the curing agent with a zinc resinate accelerator. Each of the adhesive compositions is applied to a paper backing similar to that of Examples I and II in the same manner described in these examples to prepare a cured pressure-sensitive adhesive sheet. Tapes are then slit from the cured sheet and tested for adhesion and quick stick with the results indicated in Table C. The curing conditions in the following examples are essentially the same as those described for Examples I and II except that the curing temperature is 350° F. and the curing times vary from a small fraction of a minute to slightly over a minute, although these are not indicated in the table.

TABLE C

|  | VI | VII | VIII | IX | X | XI | XII | XIII | XIV | XV | XVI | XVII |
|---|---|---|---|---|---|---|---|---|---|---|---|---|
| SBR #4502 | 100 | 100 | 100 | 100 | 100 | 100 | 100 | 100 | 100 | 100 | 100 | |
| SBR 1006 | | | | | | | | | | | | 100 |
| TPO #1 | 200 | 150 | 150 | 150 | 150 | 100 | 125 | | 75 | 30 | 400 | 150 |
| TPO #2 | | | | | | | | 150 | 75 | | | |
| Amberol ST-137 | | | 15 | 15 | 25 | 25 | 30 | | | 25 | | |
| SP-1056 | 25 | 15 | 5 | 5 | | | | 15 | 15 | | 25 | 15 |
| Zinc resinate | 10 | 5 | 5 | 10 | 10 | 10 | 20 | 5 | 5 | 15 | 10 | 5 |
| Agerite Superlite | 2 | 2 | 2 | 2 | 2 | 2 | 2 | 2 | 2 | 2 | 2 | 2 |
| Percent solids in toluene | 60 | 50 | 50 | 50 | 50 | 45 | 40 | 50 | 50 | 30 | 70 | 50 |
| Adhesion (oz.) | 33 | 25 | 35 | 40 | 50 | 40 | 30 | 50 | 36 | <10 | 37 | 22 |
| Quick Stick | 4.6 | 30 | 7 | 2 | .8 | .7 | 1 | .5 | 9 | Low | .6 | 13 |

The tapes of Examples VI and VII are all-purpose tapes of high quick stick. In fact, the tape of Example VII possesses exceptionally high quick stick without substantially sacrificing adhesive strength (given in adhesion to steel, as described hereinbefore). These tapes have their maximum effectiveness when used at temperatures below 250° F.

The tapes of Examples VIII, IX and X are particularly suited for use in assembly line masking where they may be subjected to temperatures of up to 350° F. These tapes possess excellent high temperature hold and cohesive strength and yet may be removed clean from the masked surface after the surface has been painted and baked at these temperatures without ghosting or leaving any traces of adhesive upon the surface. The tapes of Examples VIII and IX possess exceptionally high quick stick for production of masking tapes.

The tapes of Examples XI and XII are ultra-high temperature tapes, that is, they are adapted to be used at temperatures above 400° F. for masking and protective purposes in the treatment and painting of special surfaces, anodized aluminum and the like, as well as for other purposes. There presently are no commercially available pressure-sensitive adhesive tapes which will withstand such rigorous treatment.

Examples XIII and XIV illustrate packaging tapes which possess good hold to boxboard with moderate quick stick and good adhesive strength. The tape of Example XV is a very low tack tape (or sheet) intended for use with, or as, protective paper or sheeting, where high tack and adhesion are not necessary. Example XVI illustrates a general purpose tape wherein the adhesive formulation is mixed at extremely high solids. This facilitates coating and makes faster curing possible, thereby minimizing production costs. The tap of Example XVII is an all-purpose tape or sheet having very high quick stick, but only moderate adhesive strength.

EXAMPLES XVIII–XXII

A series of five adhesive compositions are formulated as indicated in Table D, below, made into tapes according to this invention and tested for adhesion to steel, quick stick and high temperature properties as described in connection with foregoing examples, with the results indicated in the table.

It will be seen that the adhesive compositions of Examples XVIII–XXII are identical except that they contain amounts of zinc resinate varying from 5 to 25 parts. These adhesive compositions are coated at a weight of 1 oz./sq. yd. on a Mylar film approximately 2 mils thick and cured at 350° F., as indicated.

TABLE D

|  | XVIII | XIX | XX | XXI | XXII |
|---|---|---|---|---|---|
| SBR 4502 elastomer | 100 | 100 | 100 | 100 | 100 |
| TPO #1 tackifier | 150 | 150 | 150 | 150 | 150 |
| Schenectady 1056 curing resin | 25 | 25 | 25 | 25 | 25 |
| Zinc resinate | 5 | 10 | 15 | 20 | 25 |
| Percent solids in toluene | 50 | 50 | 50 | 50 | 50 |
| Adhesion to steel (oz.) | 103 | 110 | 115 | 110 | 107 |
| Quick Stick | 4 | 4 | 4 | 4 | 2 |
| Curing temperature, °F | 350 | 350 | 350 | 350 | 350 |

The tape of Example XX wherein 15 parts of zinc resinate are used cures most rapidly. For instance, it reaches the moderate level of cure desirable for most adhesive tape applications in a small fraction of a minute. In general, the tapes of Examples XIX, XX and XXI cure more rapidly than those of Examples XVIII and XXII, but all of these tapes reach a tight cure in slightly over one-half a minute.

The various liquid tackifiers utilized in the foregoing examples possess the average Brookfield viscosities set forth in Table E, below, in centipoises.

TABLE E

| Tackifier: | Viscosity (cps.) |
|---|---|
| Piccodiene 2050 | 51,000 |
| Picco L-30-3 | 130,000 |
| Picco N-10-5 | 152,000 |
| Buton 100 | 180,000 |
| TPO #1 | 408,000 |
| TPO #2 | 2,240,000 |

The many examples given above highlight the unique variety of properties which are obtainable for the first time in the all SBR adhesives of this invention through the judicious choice of liquid tackifiers from the narrow range of chemical compositions disclosed herein.

Having now described the invention in specific detail and exemplified the manner in which it may be carried into practice, it will be readily apparent to those skilled in the art that innumerable variations, modifications, applications, and extensions of the basic principles involved may be made without departing from its spirit or scope.

What is claimed is:

1. A normally tacky and pressure-sensitive adhesive sheet which comprises a flexible backing coated on at least one major surface thereof with an adhesive composition comprising: a low-styrene copolymer of butadiene and styrene as the sole effective elastomer, said copolymer consisting essentially of about 70–90 parts butadiene and 30–10 parts styrene; about 25–500 parts by weight of the elastomer of a styrenated polymeric liquid tackifier compatible with said elastomer and having a viscosity of between about 5,000 and 2,500,000 centipoises, said tackifier being a hydrocarbon polymer comprising a reacted plasticizing component selected from the group consisting of diene and indene structures and a reacted styrene component selected from the group consisting of styrene and ring substituted lower alkyl styrene structures, said styrene component being present in the amount of at least about 20 percent by weight of the copolymer; and about 5–75 parts of an oil soluble elastomer-reactive heat curing aldehyde resin, said liquid tackifier being present in an amount greater than that of the aldehyde resin.

2. A pressure-sensitive adhesive sheet according to claim 1, wherein the plasticizing component of the tackifier copolymer is present in the amount of about 15–80 percent by weight of the copolymer and the styrene component is present in the amount of about 85–20 percent by weight of said copolymer.

3. A pressure-sensitive adhesive sheet according to claim 1, wherein said liquid tackifier has a viscosity not above about 500,000 centipoises.

4. A pressure-sensitive adhesive sheet according to claim 1, which comprises about 100–200 parts of said liquid tackifier.

5. A pressure-sensitive adhesive sheet according to claim 4, wherein the styrene component is selected from the group consisting of styrene and vinyl toluene structures.

6. A pressure-sensitive adhesive sheet according to claim 1, wherein the oil soluble elastomer-reactive heat curing resin is a phenol aldehyde resin.

7. A pressure-sensitive adhesive sheet according to claim 6, which further comprises a zinc resinate accelerator for curing the adhesive composition.

8. A pressure-sensitive adhesive sheet according to claim 7, wherein the zinc resinate accelerator is present in the amount of about 5–20 parts.

9. A pressure-sensitive adhesive sheet according to claim 8, wherein the phenol aldehyde curing resin is present in the amount of about 15–30 parts.

10. A pressure-sensitive adhesive sheet according to claim 6, wherein said phenol aldehyde curing resin is a bromo-methyl alkylated phenol formaldehyde resin.

11. A pressure-sensitive adhesive sheet according to claim 10, which further comprises a zinc resinate accelerator for curing the adhesive composition.

12. A pressure-sensitive adhesive sheet according to claim 10, wherein the curing resin is a para alkyl phenol formaldehyde resin bromo-methylated in one or both of the ortho positions.

13. A pressure-sensitive adhesive sheet according to claim 12, wherein the curing resin contains about 1–9 percent of bromine by weight of said resin and about 4 to 20 carbon atoms in the para alkyl group.

14. A pressure-sensitive adhesive sheet according to claim 13, which further comprises a zinc resinate accelerator for curing the adhesive composition.

15. A pressure-sensitive adhesive sheet according to claim 14, wherein zinc resinate is present in the amount of about 5–20 parts.

References Cited

UNITED STATES PATENTS

| | | | |
|---|---|---|---|
| 2,631,175 | 3/1953 | Crouch | 260—33.6 X |
| 2,708,192 | 5/1955 | Joesting | 117—122 |
| 2,972,600 | 2/1961 | Braidwood | 260—59 |
| 2,987,420 | 6/1961 | Bemmels et al. | 117—122 |
| 2,999,769 | 10/1961 | Korpman | 117—122 |
| 3,165,496 | 1/1965 | Fusco et al. | 260—59 |
| 3,231,419 | 1/1966 | Korpman | 117—122 |

WILLIAM D. MARTIN, Primary Examiner

T. G. DAVIS, Assistant Examiner

U.S. Cl. X.R.

117—161

PO-1050
(5/69)

UNITED STATES PATENT OFFICE
CERTIFICATE OF CORRECTION

Patent No. 3,535,153            Dated October 20, 1970

Inventor(s) Ralf Korpman

It is certified that error appears in the above-identified patent and that said Letters Patent are hereby corrected as shown below:

In column 5, lines 57-61 should read-- The vertical height at which the ball starts and the distance the ball rolls along the tape before coming to rest is measured. Quick stick is reported as the height in inches raised to the three-halves power, divided by the distance rolled in inches.--

SIGNED AND
SEALED
FEB 2 1971

(SEAL)
Attest:

Edward M. Fletcher, Jr.
Attesting Officer

WILLIAM E. SCHUYLER, JR.
Commissioner of Patents